UNITED STATES PATENT OFFICE.

WALLACE R. AYARS AND BURT M. ANDERSON, OF ROME, NEW YORK.

MOTION-COUNTER.

1,167,250. Specification of Letters Patent. Patented Jan. 4, 1916.

Application filed April 23, 1915. Serial No. 23,371.

*To all whom it may concern:*

Be it known that we, WALLACE R. AYARS and BURT M. ANDERSON, both citizens of the United States, and residents of Rome, in the county of Oneida and State of New York, have invented a new and Improved Motion-Counter, of which the following is a full, clear, and exact description.

The object of the invention is to provide a new and improved motion counter for convenient application to a moving part of a machine, the motions of which are to be counted, and arranged to indicate the number of motions made by the moving member of a machine and at the same time registering the time during which the motions are counted.

In order to accomplish the desired result use is made of a motion indicator, driving means for the said motion indicator and adapted to be driven from the moving machine member, a time indicator, a motor for the same, and manually or automatically controlled connecting means adapted simultaneously to connect the said driving means with the said motion indicator and the said motor with the said time indicator simultaneously to start, stop and reset the said motion indicator and the said time indicator.

A practical embodiment of the invention is represented in the accompanying drawings forming a part of this specification, in which similar characters of reference indicate corresponding parts in all the views.

In the drawings, the motion counter is illustrated to count the revolutions of a shaft or other rotating part of a machine and is shown as having manually controlled means for starting, stopping and resetting, but we do not limit ourselves to this particular application or construction of the counter as the same may be applied to and used on reciprocating or otherwise moving parts of machines or devices for counting the motions thereof in a given time or may be constructed with either manually or automatically controlled means for starting, stopping, or resetting.

Figure 5:
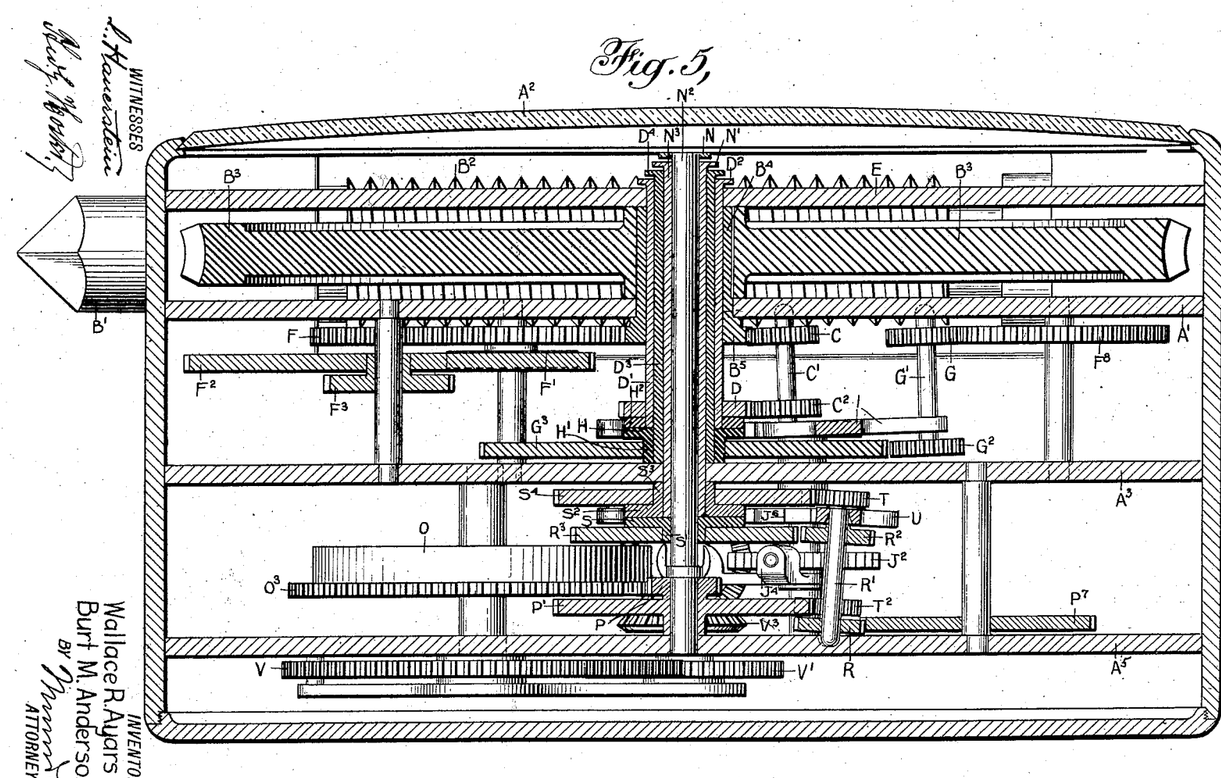
Fig. 5 is an enlarged cross section of the same on the line 5—5 of Fig. 6.

The motion counter is mounted on a suitably constructed casing A in which is journaled a shaft B having one end B' extending beyond the casing for engagement with a shaft or other moving member, the motions of which are to be counted. When the motion counter is applied the shaft B moves in unison with the machine member. On the shaft B is secured or formed a worm $B^2$ in mesh with a worm wheel $B^3$ having one hundred teeth so that the worm wheel $B^3$ makes one revolution to one hundred revolutions of the worm $B^2$ and its shaft B. The worm wheel $B^3$ is connected or otherwise secured (see Fig. 5) to the hub $B^4$ of a gear wheel $B^5$, the hub being journaled in a partition A' forming part of the casing A. The gear wheel $B^5$ is at all times in mesh with a pinion C secured on a pinion shaft C' provided with a second pinion $C^2$ normally out of mesh with a gear wheel D or adapted to be moved in mesh with the same, as hereinafter more fully explained. The gear wheel D is secured to a hollow shaft or spindle D' carrying at its upper end a pointer $D^2$ indicating on a circular graduation E' on a dial E held in the upper end of the casing and visible through a cover $A^2$ attached to the casing and made of glass or other diaphanous material. The gear wheels $B^5$ and D are of the same diameter and likewise the pinions C and $C^2$ so that when the worm wheel $B^3$ makes one revolution the pointer $D^2$ likewise makes a single revolution. The graduation E' has one hundred equal marks so that the pointer $D^2$ readily indicates the number of revolutions made by the worm $B^2$.

Figure 1:
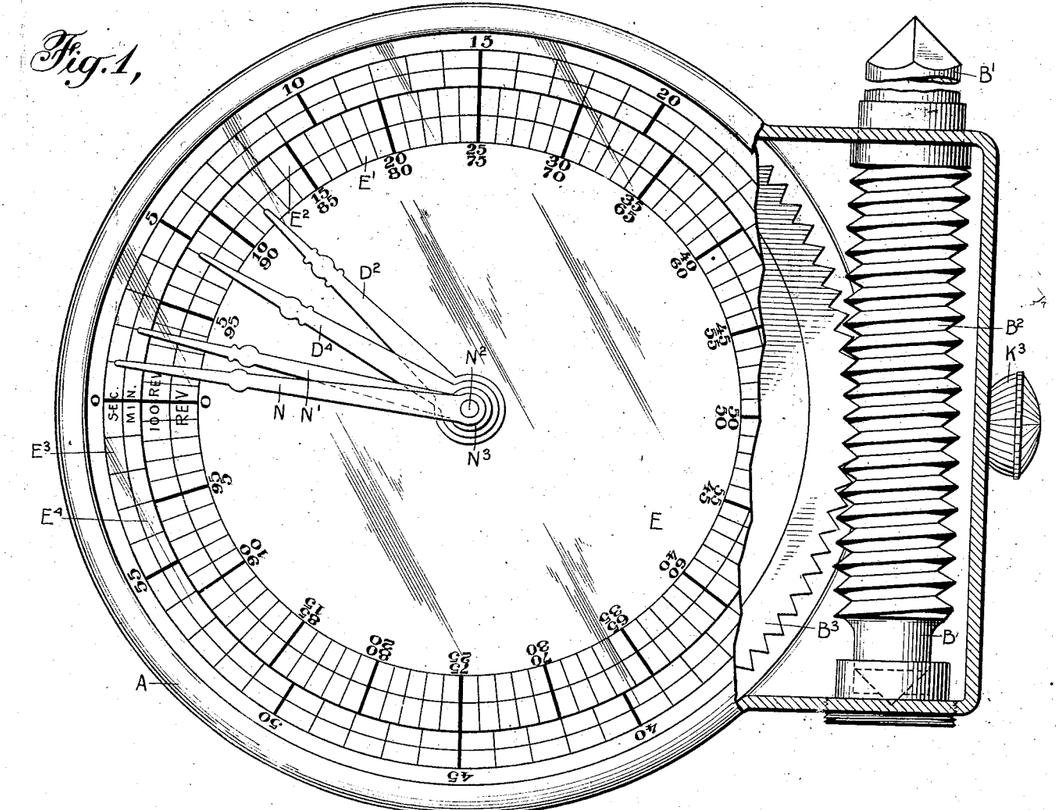
Figure 1 is a plan view of the motion counter with part of the casing shown in section on the line 1—1 of Fig. 6.

The gear wheel $B^5$ is in mesh with a gear wheel F (see Fig. 2) forming one of a train of gear wheels F, F', $F^2$, $F^3$, $F^4$, $F^5$, $F^6$, $F^7$, and $F^8$, journaled in the casing, and of which the last gear wheel $F^8$ of the train of gear wheels is at all times in mesh with a pinion G (see Figs. 2 and 5) secured on a pinion shaft G' provided with a second pinion $G^2$ normally out of mesh with a gear wheel $G^3$ but adapted to be thrown in mesh with this gear wheel, as hereinafter more fully explained. The gear wheel $G^3$ is secured on the hub H' of a heart-shaped cam H secured to the lower end of a hollow shaft or spindle $D^3$ extending through the spindle D' and provided at its upper end with a pointer $D^4$ indicating on an annular graduation $E^2$ arranged on the dial E concentric with the graduation $E'$ and likewise divided into a hundred equal parts. The train of gear wheels is so proportioned that when the pinion $G^2$ is in mesh with the gear wheel $G^3$ and the counter is in use then the pointer $D^4$ makes one revolution to one hundred revolutions of the pointer $D^2$; or, in other words, the pointer $D^4$ moves to the next mark on the graduation $E^2$ whenever the pointer $D^2$ completes a revolution. As shown in Fig. 1, the pointers $D^2$ and $D^4$ indicate that the worm $B^2$ and its shaft B have made 812 revolutions.

Figures 6, 7, 8:
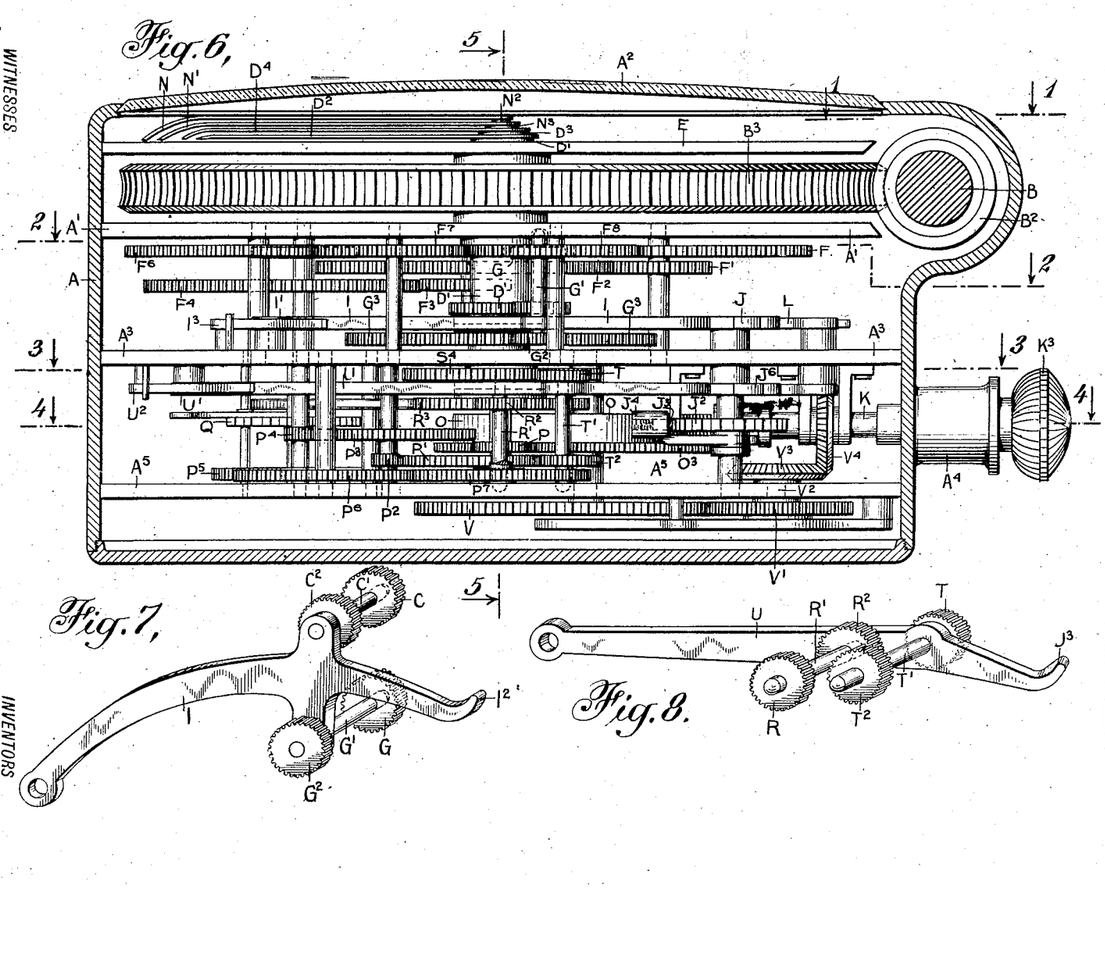
Fig. 6 is a sectional side elevation of the same.
Fig. 7 is a perspective view of the controlling lever for the motion indicator.
Fig. 8 is a similar view of the controlling lever for the time indicator.

The upper ends of the shafts $C'$ and $G'$ (see Fig. 5) are hemispherical and engage corresponding bearings in the partition $A'$ to allow a slight swinging motion of the shafts $C'$ and $G'$ with a view to move the gear wheels $C^2$, $G^2$ in or out of mesh with the corresponding gear wheels D and $G^3$. The lower ends of the shafts $C'$ and $G'$ are journaled in a controlling lever I (see Figs. 2, 5 and 7) fulcrumed at $I'$ on a partition $A^3$ forming part of the casing A. The free end $I^2$ of the controlling lever I engages the peripheral face of a cam wheel J secured on the upper end of a shaft $J'$ journaled in suitable bearings on the partition $A^3$. A spring $I^3$ (see Fig. 2) is attached to the partition $A^3$ and bears on the controlling lever I to hold the free end $I^2$ thereof in engagement with the peripheral face of the cam wheel J. On the shaft $J'$ (see Figs. 4 and 6) is secured a ratchet wheel $J^2$ engaged by a spring-pressed pawl $J^3$ held on the arm $J^4$ of a bell crank lever mounted to swing loosely on the shaft $J'$ as the fulcrum and having its other arm $J^5$ extending between two collars $K'$ and $K^2$ secured on a shaft K mounted to turn and to slide in a suitable bearing $A^4$ arranged on the peripheral face of the casing A. The outer end of the shaft K is provided with a knob $K^3$ under the control of the operator for turning the shaft K and for moving the same in the direction of its length. In the bearing $A^4$ is arranged a spring $K^4$ bearing against the knob $K^3$ to hold the shaft K normally in outermost position, the outward movement being limited by a stop collar $K^5$ held on the shaft K and abutting against the inner face of the casing A. When the knob $K^3$ is pressed inward then a swinging motion is given by the collars $K'$, $K^2$ to the arm $J^5$ of the bell crank lever so that the arm $J^4$ thereof causes the pawl $J^3$ to rotate the ratchet wheel $J^2$ in the direction of the arrow $a'$ whereby a like turning movement is given to the shaft $J'$ and the cam wheel J. The rotation given to the cam wheel J causes the free end $I^2$ of the controlling lever I to drop into a notch in the adjacent tooth of the cam wheel so that the lever I is caused to swing inwardly by the action of its spring $I^3$ thus carrying the shafts $C'$ and $G'$ along and thereby moving the pinions $C^2$ and $G^2$ in mesh with the corresponding gear wheels D and $G^3$ to rotate the spindles $D'$ and $D^3$ and to move the pointers $D^2$ and $D^4$ to indicate on the graduations $E'$ and $E^2$, as previously explained. When the operator releases the pressure on the knob $K^3$ then the spring $K^4$ returns the shaft K to an outermost position and in doing so the collars $K'$, $K^2$ cause a returning swinging movement of the arms $J^5$, $J^4$ of the bell crank lever and the pawl $J^3$ glides over the back of one tooth of the ratchet wheel $J^2$ to engage the front of the tooth. When the knob $K^3$ is pressed a second time in an inward direction then the cam wheel J is again rotated to impart a return or outward swinging movement to the lever I thereby moving the pinions $C^2$ and $G^2$ out of mesh with the gear wheels D and $G^3$ to stop the further movement of the pointers $D^2$ and $D^4$.

In order to return the pointers $D^2$ and $D^4$ to zero position on the graduations $E'$ and $E^2$, the following arrangement is made: Directly above the heart-shaped cam H is arranged a second heart-shaped cam $H^2$, and said heart-shaped cam $H^2$ is fastened to the lower end of the spindle $D'$. The peripheral faces of the heart-shaped cams H and $H^2$ are engaged by the free end $L'$ of a resetting lever L, fulcrumed at $L^2$ on the partition $A^3$ and pressed on by a spring $L^3$ to hold the free end $L'$ in engagement with the peripheral face of the cams H and $H^2$ (see Fig. 2). The resetting lever L is provided with a tooth $L^4$ engaging the peripheral face of the cam wheel J so that the resetting lever L is controlled by the movement of the cam wheel J. During the time the knob $K^3$ is pressed twice as above described the tooth $L^4$ moves out of the notch of the cam wheel J onto the peripheral face of a tooth and along the same to near the end thereof, to swing the resetting lever outward into inactive position to allow free rotation of the cams H, $H^2$ and their spindles $D^3$ and $D'$. When the knob K is pressed a third time and the cam wheel J rotates then the next notch moves into register with the tooth $L^4$, and the resetting lever L is now caused to swing inward by the action of its spring $L^3$, and in doing so it acts on the cams H and $H^2$ to return the same to normal position. This return movement of the cams H and $H^2$ causes a return movement of the spindles $D'$ and $D^3$ whereby the pointers $D^2$ and $D^4$ are returned to zero position.

Figure 2:
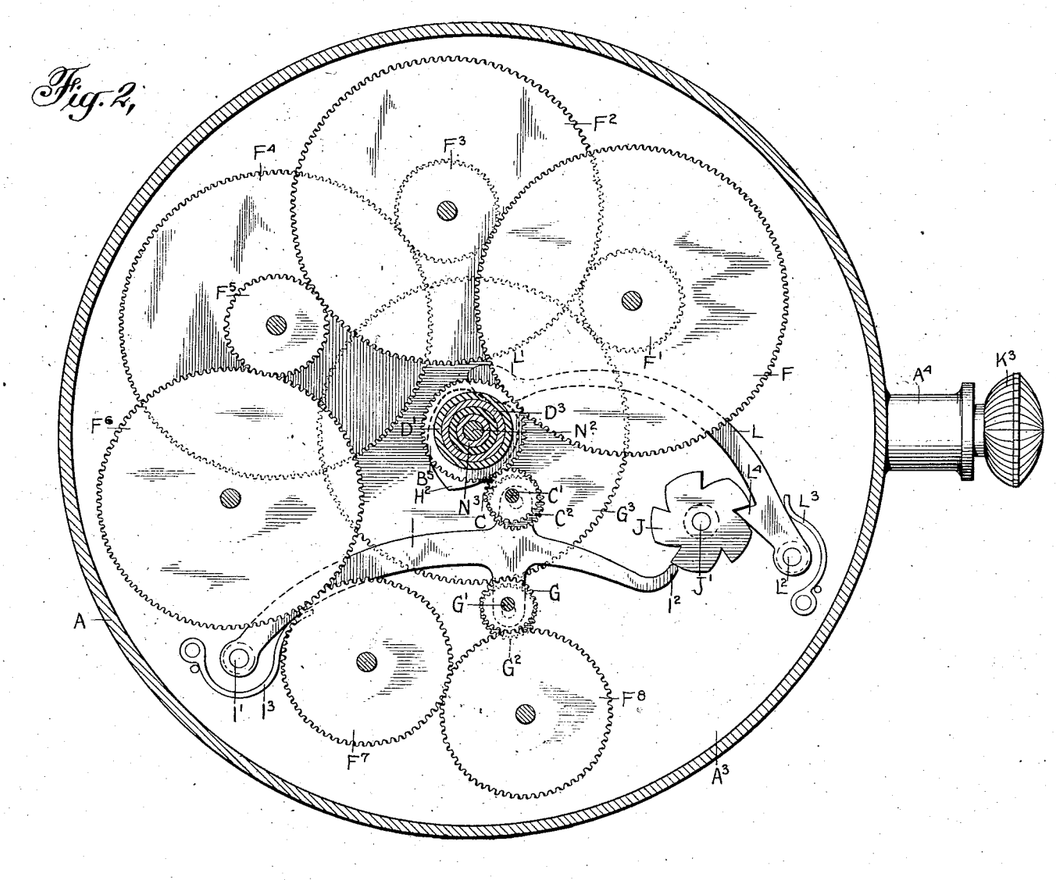
Fig. 2 is a sectional plan view of the same on the line 2—2 of Fig. 6.
Figure 3:
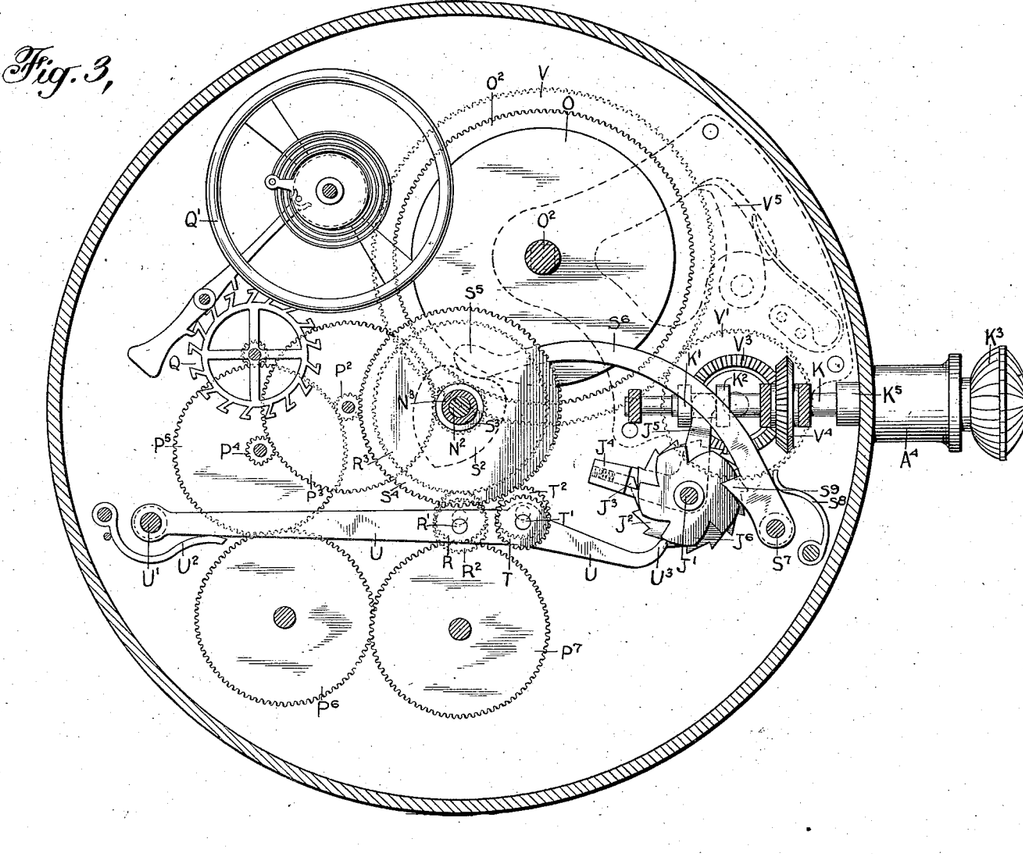
Fig. 3 is a similar view of the same on the line 3—3 of Fig. 6.
Figure 4:
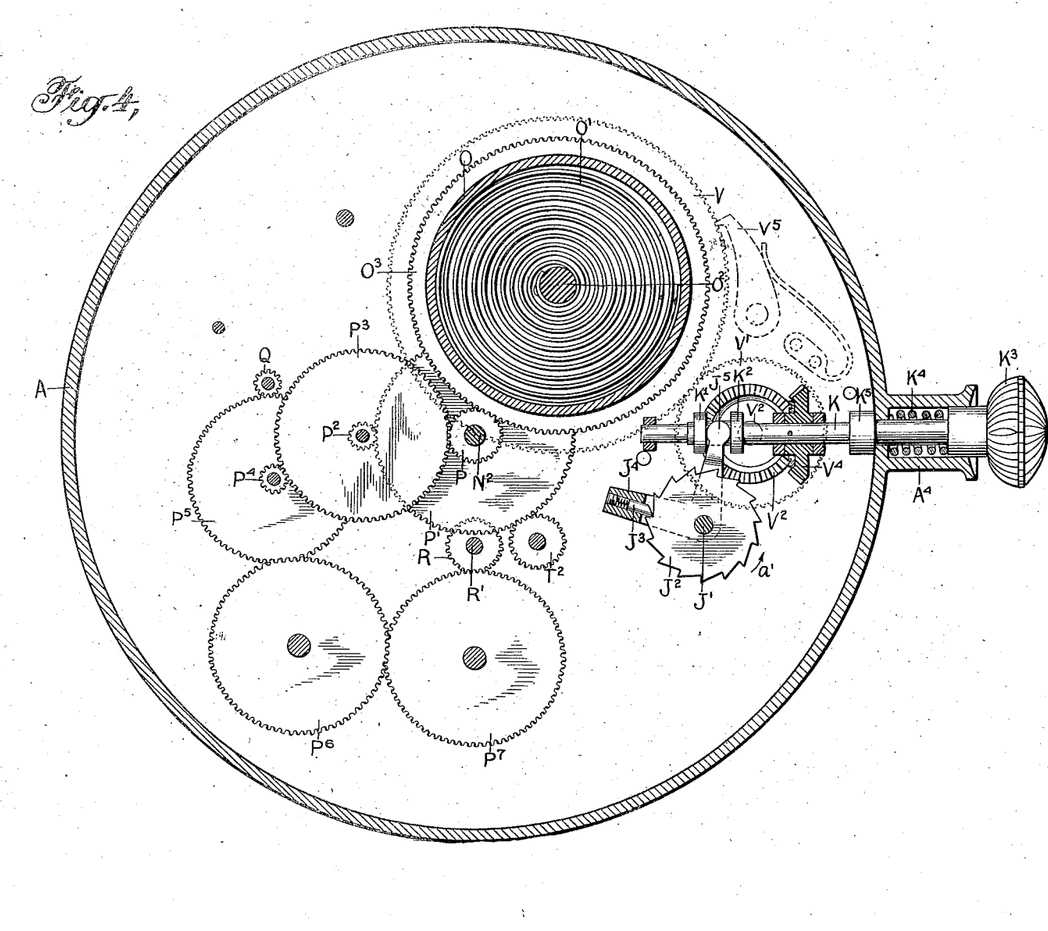
Fig. 4 is a similar view of the same on the line 4—4 of Fig. 6.

By reference to Figs. 2, 3 and 4, it will be noticed that the cam wheels J and $J^6$ are each provided with five teeth while the ratchet wheel has fifteen teeth. Hence three operations of the knob $K^3$ are necessary to a complete cycle of operations. On the first operation of the knob $K^3$ the free end $I^2$ of the controlling lever I is lifted out of one depression of the cam wheel J and during this time the tooth $L^4$ moves from one end to the other end of the cam tooth. At the next operation of the knob $K^3$, the end $I^2$ moves from one end of a tooth of the cam wheel J to the other end thereof and during this time the tooth $L^4$ drops. On the third operation of the knob $K^3$ the tooth $L^4$ is lifted and the free end $I^2$ of the controlling lever I drops into the next following depression of the cam wheel J.

A time indicator is used for indicating the exact time during which the pointers $D^2$ and $D^4$ are moving and for this purpose use is made of two pointers or hands N and N' adapted to indicate on annular graduations $E^3$, $E^4$ arranged on the dial E concentric with the graduations E' and $E^2$. The graduation $E^3$ indicates sixty seconds and the graduation $E^4$ sixty minutes and when the pointer N has completed one revolution one minute has elapsed, and when the pointer N' has made one complete revolution an hour has elapsed. As shown in Fig. 1, the pointers N and N' indicate two minutes and one second; or, in other words, the pointers $D^2$, $D^4$, N and N', as shown in Fig. 1, indicate that the shaft B, and consequently the rotating machine member, have each made 812 revolutions in 2 minutes and 1 second.

A motor in the form of a clockwork is used for moving the pointers or hands N and N', and is arranged as follows: The pointer N is secured on a shaft or spindle $N^2$ extending through a hollow shaft or spindle $N^3$. The spindle $N^3$ is journaled in the partition $A^3$ and the shaft $N^2$ has its lower end journaled in a partition $A^5$ forming part of the casing A (see Fig. 5). A spring barrel O is arranged in the casing between the partitions $A^3$ and $A^5$ and it contains a helical spring O' secured at its outer end to the inner face of the rim of the barrel and having its inner end attached to a shaft $O^2$ journaled in the partitions $A^3$, $A^5$. On the spring barrel O is secured or formed a gear wheel $O^3$ in mesh with a pinion P mounted to rotate loosely on the lower end of the spindle $N^2$ and attached to the upper face of a gear wheel P' likewise loose on the spindles $N^2$ (see Figs. 4 and 5). The pinion P and the gear wheel P' form parts of a train of gear wheels $P^2$, $P^3$, $P^4$, $P^5$, $P^6$, and $P^7$ journaled in the casing A at the partitions $A^3$ and $A^5$. The gear wheel $P^5$ of this train of gear wheels is geared with the usual escapement and balance mechanism Q, Q' (see Fig. 3) to provide an intermittent movement of the train of gear wheels. The gear wheel $P^7$ of the train of gear wheels is in mesh with a pinion R (see Figs. 4 and 5) secured on the lower end of a pinion shaft R' provided with a second pinion $R^2$ normally out of mesh with a gear wheel $R^3$ but adapted to be moved in mesh with the said gear wheel as hereinafter more fully explained. The gear wheel $R^3$ is secured on the hub S' of a heart-shaped cam S secured to the spindle or shaft $N^2$ carrying the second hand or pointer N. Directly above the heart-shaped cam S is arranged a second heart-shaped cam $S^2$ having its hub $S^3$ secured to the spindle $N^3$ carrying the minute hand or pointer N', and on the hub $S^3$ is secured a gear wheel $S^4$ normally out of mesh with a pinion T adapted to be moved in mesh with the said gear wheel $S^4$, as hereinafter more fully explained. The pinion T is secured on the upper end of a pinion shaft T' provided near its lower end with a second pinion $T^2$ in mesh at all times with the gear wheel P' (see Figs. 4, 5 and 6). The lower ends of the pinion shafts R' and T' are hemispherical and engage corresponding bearings in the partition $A^5$ (see Fig. 6) and the upper ends of the said pinion shafts R' and T' are journaled in a lever U (see Figs. 3 and 8) fulcrumed at U' on the under side of the partition $A^3$. A spring $U^2$ held on the partition $A^3$ bears on the lever U so as to hold the free end $U^3$ of the said lever in engagement with the peripheral face of a cam wheel $J^6$ similar to the cam wheel J previously mentioned, and likewise secured on the shaft J', to rotate with the same as before stated. By the arrangement described the cam wheel $J^6$ actuates the controlling lever U in the same manner and simultaneously with the controller lever I so that the pinions $R^2$ and T are moved simultaneously in and out of mesh with the gear wheels $R^3$, $S^4$ and at the same time that the pinions $C^2$ and $G^2$ are moved in and out of mesh with their gear wheels D and $G^3$. When the pinions $R^2$ and T are in mesh with their gear wheels $R^3$ and $S^4$ then the spindles $N^2$ and $N^3$ are driven in harmony with the correct time so that the pointers or hands N and N' indicate the correct time during which the pointers $D^2$ and $D^4$ are moving. The peripheral faces of the heart-shaped cams S and $S^2$ are engaged by the free end $S^5$ of a resetting lever $S^6$ fulcrumed at $S^7$ on the partition $A^3$ (see Figs. 3 and 6). The lever $S^6$ is pressed on by a spring $S^8$ and is provided with a tooth $S^9$ in engagement with the cam wheel $J^6$ for returning the cams S and $S^2$ to zero position whenever the knob $K^3$ is pressed the third time, as previously explained, so that the second and minute hands N and N' return to zero position simultaneously with the pointers $D^2$ and $D^4$.

The spring O' is adapted to be wound up from the shaft K on turning the latter and for this purpose the following arrangement is made: On the lower end of the shaft $O^2$ of the spring motor is secured a gear wheel V in mesh with a gear wheel V' secured on the lower end of a shaft V² journaled in the partition A⁵ (see Figs. 3, 4 and 6). On the upper end of the shaft V² is secured a bevel gear wheel V³ in mesh with a bevel gear wheel V⁴ attached to the shaft K so that when the latter is rotated by the operator turning the knob K³ then a rotary motion is given by the bevel gear wheels V⁴, V³ to the shaft V² which by the gear wheels V' and V rotates the shaft O² to wind up the spring O'. A spring-pressed pawl or click V⁵ engages the gear wheel V to hold the shaft O² from rotating in a reverse direction thus allowing the spring O' to rotate the barrel O for setting the clock mechanism in motion as above explained.

The operation is as follows: When the several parts of both the motion indicator and the time indicator are in normal inactive position then the shaft B is engaged with the moving member of the machine, the motions of which are to be counted, and when this has been done the operator presses and releases the knob K³ to cause a transmission of the motions of the shaft B to the pointers D² and D⁴ to start the same from their normal zero position, at the same time the time indicator is started to cause the hands N and N' to start from their normal zero position. The operator after any desired lapse of time presses and releases the knob K³ so that the motion indicator is moved out of gear with the shaft B and likewise the time indicator is thrown out of mesh with its motor, that is, the spring barrel O. The motion counter may now be removed from the machine on which it has been applied and the operator can see at a glance how many revolutions the shaft B made in the time indicated by the pointers N and N'. Thus, as shown in Fig. 1, and as previously mentioned, the shaft B made 812 revolutions in 2 minutes and 1 second, it being understood that the several parts, as shown in the drawings, are in position after the second pressing and releasing of the knob K³. In order to reset the motion indicator and the time indicator, the operator once more presses and releases the knob K³ so as to cause the resetting levers to act on their corresponding cams H and H² and S, S² for returning the pointers D², D⁴ and N, N' to zero position. The motion counter is now again set for further use. It will be noticed that by the arrangement described it is not necessary for the user to apply the motion counter for a certain predetermined length of time to the machine of which the revolutions are to be counted, it being understood that it is only necessary for the operator to press and release the knob K³ after the counter is applied to the machine and then to press it again after any desired length of time to obtain the desired result. It is understood that the result obtained can be easily reduced, by simple calculation, to revolutions per second or per minute, if desired. In the example given the shaft B made 6.71 revolutions per second or approximately 402 revolutions per minute. After the result has been obtained the operator, by simply pressing the knob K³ again, causes a resetting of the counter.

It is understood that by the arrangement described, use is made of a motion indicator normally out of gear with the means for driving it and which means is actuated from a revolving or moving part of a machine on which the counter is applied. The motion indicator and its driving means are connected with each other by the manually controlled connecting means whenever the knob K³ is pressed and released once, and the said motion indicator and its driving means are disconnected on pressing and releasing the knob K³ a second time, and on pressing the knob a third time the motion indicator is reset to zero position.

The timing device consists essentially of a time indicator including dial and hands adapted to be driven by a spring motor normally out of gear with the time indicator and adapted to be thrown in and out of gear by a connecting means controlled by the other connecting means for the motion indicator and its driving means so that both the motion indicator and the time indicator are started and stopped simultaneously and are also reset to zero position simultaneously.

It will be noticed that the motion indicator, the means for driving the same, the manually controlled means for connecting and disconnecting the said motion indicator with the driving means and the resetting device for the motion indicator may be used without the timing device in case it is desired to do so.

Having thus described our invention, we claim as new and desire to secure by Letters Patent:

1. A motion counter, comprising a motion indicator, actuating means for the said indicator and normally out of engagement with the same, the said actuating means being controlled by a moving part of a machine, a time indicator, a motor for driving the said time indicator and normally out of engagement with the same, and connecting means adapted to simultaneously connect the said actuating means with the said motion indicator and the said motor with the said time indicator to simultaneously start the said motion indicator and the said time indicator.

2. A motion counter, comprising a motion indicator, actuating means for the said indicator and normally out of engagement with the same, the said actuating means being controlled by a moving part of a machine, a time indicator, a motor for driving the said time indicator and normally out of engagement with the same, and connecting means adapted to simultaneously connect the said actuating means with the said motion indicator and the said motor with the said time indicator to simultaneously start the said motion indicator and the said time indicator, the said means on being actuated a second time simultaneously disconnecting the said actuating means from the motion indicator and the said motor from the time indicator.

3. A motion counter, comprising a motion indicator, actuating means for the said indicator and normally out of engagement with the same, the said actuating means being controlled by a moving part of a machine, a time indicator, a motor for driving the said time indicator and normally out of engagement with the same, connecting means adapted to simultaneously connect the said actuating means with the said motion indicator and the said motor with the said time indicator to simultaneously start the said motion indicator and the said time indicator, the said means on being actuated a second time simultaneously disconnecting the said actuating means from the motion indicator and the said motor from the time indicator, and a resetting device controlled by the said controlled means for simultaneously returning the said motion indicator and the said time indicator to zero position.

4. A motion counter, comprising a motion indicator, a driving mechanism for the said motion indicator and having a spindle adapted to be driven from a machine part, the said driving mechanism being normally disconnected from the said motion indicator, a time indicator, a motor for the said time indicator and normally out of engagement with the time indicator, and connecting means adapted to simultaneously connect the said driving means with the said motion indicator and the said motor with the said time indicator to simultaneously start the said motion indicator and the said time indicator.

5. A motion counter, comprising a motion indicator, a driving mechanism for the said motion indicator and having a spindle adapted to be driven from a machine part, the said driving mechanism being normally disconnected from the said motion indicator, a time indicator, a motor for the said time indicator and normally out of engagement with the time indicator, and connecting means adapted to simultaneously connect the said driving means with the said motion indicator and the said motor with the said time indicator to simultaneously start and stop the said motion indicator and the said time indicator.

6. A motion counter, comprising a motion indicator, a time indicator, the said indicators having each a set of pointers and a dial, the latter being provided with two graduations, on one of which indicate the pointers of the said motion indicator and on the other graduation indicate the pointers of the said time indicator, a driving mechanism for the said motion indicator and normally out of engagement with the same, the driving mechanism having a member adapted to be driven by a part of a machine, a motor for driving the said time indicator, a lever carrying means for connecting the said driving mechanism with the said motion indicator, a second lever having means for connecting the said motor with the said time indicator, a cam shaft carrying cam wheels engaged by the said levers, and means for intermittently rotating the said cam shaft to actuate both levers simultaneously for starting and stopping the said indicators.

7. A motion counter, comprising a motion indicator, a time indicator, the said indicators having each a set of pointers and a dial, the latter being provided with two graduations, on one of which indicate the pointers of the said motion indicator and on the other graduation indicate the pointers of the said time indicator, a driving mechanism for the said motion indicator and normally out of engagement with the same, the driving mechanism having a member adapted to be driven by a part of a machine, a motor for driving the said time indicator, a lever carrying means for connecting the said driving mechanism with the said motion indicator, a second lever having means for connecting the said motor with the said time indicator, a cam shaft carrying cam wheels engaged by the said levers, means for intermittently rotating the said cam shaft to actuate both levers simultaneously for starting and stopping the said indicators, and a resetting device connected with and controlled by the said cam wheels to reset the sets of pointers to zero.

In testimony whereof we have signed our names to this specification in the presence of two subscribing witnesses.

WALLACE R. AYARS.
BURT M. ANDERSON.

Witnesses:
JAMES J. HINKLEY,
A. B. DURFEE.